Sept. 23, 1952  C. F. DERBYSHIRE  2,611,665
BEARING CONSTRUCTION
Filed Jan. 4, 1949

Charles F. Derbyshire
INVENTOR.

BY *James M. Clark*

Patented Sept. 23, 1952

2,611,665

UNITED STATES PATENT OFFICE 2,611,665

BEARING CONSTRUCTION

Charles F. Derbyshire, Chula Vista, Calif., assignor to The Ryan Aeronautical Co., a corporation of California Application January 4, 1949, Serial No. 69,098

10 Claims. (Cl. 308—95)

The present invention relates to bearings and more particularly to an improved bearing construction including an internal lubricant reservoir.

This invention is directed primarily to bearings for mounting a driven or otherwise rotatable member upon a fixed shaft or spindle. The improved bearing construction consists essentially of a fixed shaft or spindle member with an enlarged portion having beveled or tapered bearing faces and a two-part rotatable sleeve member having complementary beveled bearing faces. It includes means for adjustably assembling the sleeve member about the shouldered portion of the spindle member at predetermined axial and radial clearances to provide a substantially vibrationless bearing. The present improvement also includes provision for lubricating the beveled bearing faces from a segmental cut-out portion within the enlarged portion of the spindle member to provide an oil reservoir at the bottom of the bearing assembly with a transverse slot provided for a wick serving as a barrier to prevent rotation of the oil freely about the bearing while insuring positive lubrication of the beveled bearing faces.

It is, accordingly, a major object of the present invention to provide an improved self-lubricating bearing for relatively fixed and rotatable members. It is a further object to provide an improved arrangement of the bearing faces between a relatively fixed shaft, or spindle, and a rotatable driven member. A further object resides in the provision of improved means for adjusting and predetermining the clearances between relatively fixed and movable members such that a substantially vibrationless bearing results.

A further object of the present invention resides in the improved construction and relationship of a fixed spindle and an adjustable rotatable sleeve member having accurate adjustment and positive lubricating means which provide a bearing installation which does not develop the adverse vibration and heating characteristics of conventional bearings of the ball, roller or other anti-friction type. It is a further object to provide an improved lubricating system for a bearing in which the lubricant or oil pressure and feed is developed in proportion to the speed at which the bearing is operated. A further and corollary objective is the provision of an improved bearing construction and lubricating means therefore in which a uniform friction characteristic is developed at a constant bearing speed. It is a still further object to provide improved lubricating means for such bearings which utilizes a self-contained lubricant reservoir and a transversely disposed capillary wick at the trailing end of the reservoir to both lubricate the bearing surfaces and to serve as a dam to prevent oil rotating around the bearing in other than the bearing surfaces. A further object resides in an improved arrangement for retaining a capillary lubricant wick, and means for readily replenishing or servicing the entire bearing as well as the lubricant and the wick.

Other objects and advantages of the present invention will become apparent to those skilled in the art after reading the following description, taken in conjunction with the accompanying drawings forming a part hereof, in which.

Figure 1:
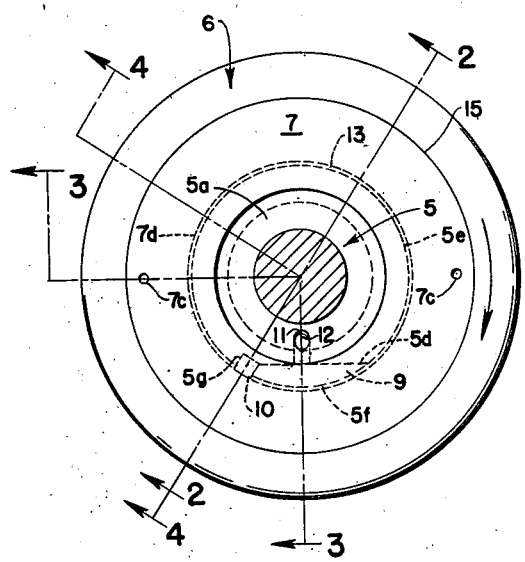
Fig. 1 is an end elevational view of a bearing for a fixed shaft and rotatable member to which a preferred form of the present invention has been applied.
Figure 2:
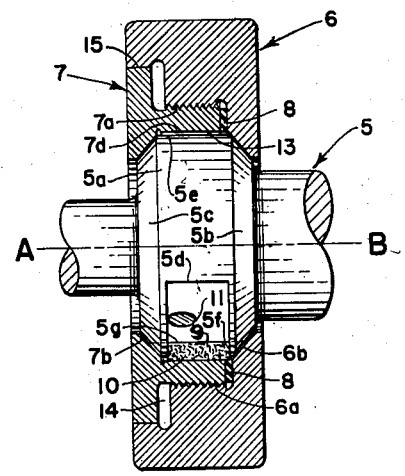
Fig. 2 is a transverse cross-sectional view of the bearing shown in Fig. 1, as taken along the lines 2—2 thereof.

Referring now to Figs. 1 and 2, the numeral 5 represents a stationary shaft or spindle having an enlarged shouldered portion 5a which is provided with beveled or chamfered bearing faces 5b and 5c. The outer face 5e of the enlarged spindle portion 5a is a cylindrical surface but has a segmental portion milled out or removed at its lower side as indicated by the dotted line 5d in Fig. 1, and the full lines 5d as shown in Fig. 2. As may be seen in the latter figure, the transverse width (as measured axially or in the direction of the spindle axis A—B, about which the rotatable elements 6 and 7 rotate), is not as great as the full width of the cylindrical face 5e, but a flanged wall portion 5f remains at each side. These remaining portions or flanges 5f permit the bearing faces 5b and 5c to be continuous and uninterrupted circumferentially as are also the narrow face portions of the cylindrical portions 5e, such that the bearing surfaces are not interrupted due to milling out the segmental recess indicated at 5d.

The movable or rotatable sleeve assembly is formed by the two complementary elements 6 and 7 which are threaded at 6a and 7a respectively, such that they threadedly engage each other in a telescopic relationship and compress the gasket 8 of composition or synthetic rubber material between these rotatable elements as they are threaded into position. The outer element 6 is provided with an inwardly facing beveled bearing surface 6b, which is tapered or sloped at the same angle as the corresponding bearing face 5b within which it rotates, and the mating element 7 has a similar but oppositely sloping bearing surface 7b which slopes in the same direction and at the same angle as the bearing surface 5c of the spindle. The sloping surfaces 5b and 5c may be said to be conic or tapered and to converge outwardly but are flattened off by the cylindrical surface 5e. The sleeve elements 6 and 7 are assembled from opposite sides of the enlarged diameter portion 5a of the spindle and are provided with internal bores, or openings, which permit them to be slid axially along the shaft portions of the spindle. The latter shaft portions may be of different diameters as indicated in Fig. 2. The elements 6 and 7 are preferably provided with holes such as that indicated at 7c in Fig. 1 which are adapted to be engaged by spanner wrenches to facilitate the threaded engagement of the two parts 6 and 7 of the sleeve assembly. It will be noted that by relative rotation of one of the members with respect to the other, the bearing faces of the sleeve elements can be caused to engage the bearing faces of the spindle element with predetermined clearances of considerable accuracy depending upon the fineness of the pitch of the threads 6a and 7a, and a rotating fit is accordingly obtained which reduces both the axial and radial play between the fixed and rotating parts to a minimum.

Figure 4:
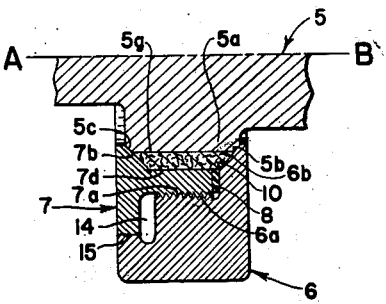
Fig. 4 is a similar part cross-sectional view as taken along the lines 4—4 of Fig. 1.
Figure 4A:
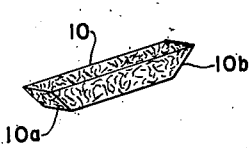
Fig. 4A is an enlarged perspective view of the wick for the bearing.

The inner sleeve element 7 is provided with an internal cylindrical surface 7d of slightly greater diameter than the diameter of the cylindrical face 5e of the spindle such that an annular clearance space 13 is provided circumferentially between the elements 5 and 7. This clearance space 13 runs into the larger segmental space 9 formed by the chordal cut portion at 5d and the space 9 provides a reservoir for the oil or other lubricant used in providing for the continuous self-lubrication of the tapered bearing faces 5b—6b, and 5c—7b. By reference to Fig. 1, it will be noted that the present bearing as indicated by the arrow is arranged for rotation of the outer rotatable sleeve assembly in the clockwise direction as viewed in this figure. There is provided at the trailing portion of the reservoir 9 a keyway 5g, of preferably square cross-section, extending in the transverse direction, or parallel to the axis A—B of the spindle 5. The keyway 5g is arranged to receive a wick 10 which may be of a fibrous construction having a square cross-section and beveled ends 10a and 10b as shown in the perspective detail in Fig. 4A. The keyway 5g is cut entirely through the transverse width of the enlarged shouldered portion 5a, extending through the bearing faces 5b and 5c, and the beveled ends 10a and 10b of the wick 10 are shaped such that they are flush with the bearing faces 5b and 5c and bear against the corresponding bearing faces 6b and 7b of the sleeve elements.

The position of the wick 10 at the trailing side of the reservoir 9, at which the lubricant would normally have a tendency to rotate with the sleeve assembly 6—7, causes the wick to serve as a barrier or dam to prevent the lubricant from rotating around through the annular space 13 by retaining the same within the reservoir 9 where its absorption by the wick 10 is assured. The position of the wick also causes it to be saturated with lubricant at slight pressures which are developed at the trailing portion of the reservoir by the rotational speed of the sleeve assembly and due to the tendency of the lubricant to rotate with the sleeve. Inasmuch as the wick is supported by solid material on all of its faces with the exception of the side exposed to the reservoir and its end faces in engagement with the bearing faces of the sleeve assembly, a continuous and positive flow of lubricant is assured by its capillary action from the reservoir through the wick and onto the tapered bearing faces 6b and 7b. Due to the relationship of the wick 10 to the reservoir 9 in respect to the fixed and rotating elements both the pressure and feed of the lubricant is increased in proportion as the speed of assembly is increased and for this reason the present bearing construction does not develop the heat or vibrational characteristics which are typical of conventional sleeve and anti-friction type bearings.

Figure 3:
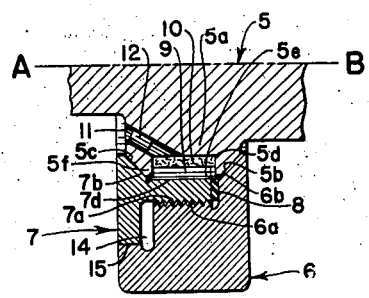
Fig. 3 is a part cross-sectional view as taken along the lines 3—3 of Fig. 1.

To facilitate replenishing the lubricant within the reservoir 9, there is provided an outwardly sloping oil hole 11, as more clearly shown in Fig. 3, which may be sealed by means of the composition or synthetic rubber plug 12. Inasmuch as the bearing faces 5b and 5c converge toward each other outwardly, the centrifugal effect created by the rotation of the sleeve assembly tends to return the oil outwardly and centrally into the annular space 13 and back to the reservoir 9. Accordingly, relatively little if any oil is lost by movement toward the axis of rotation A—B either through the bearing faces 5b and 5c or the oil filler hole and plug 11 and 12. The oil is prevented from passing outwardly between the sleeve elements 6 and 7 by the annular gasket 8 which fills the recess between the sleeve elements at one end of the threads 6a—7a and a larger or wider recess 14 is provided at the opposite end of the threads, having sufficiently greater clearance at the space 14 to insure an adequate range of adjustment in fitting the sleeve elements upon the tapered bearing faces of the spindle, and also insuring sufficient compression of the gasket 8 to seal the space it occupies.

The inner sleeve element 7 is in effect an adjusting flange which when rotated around the axis A—B to engage the oil bearing face 5c also causes the corresponding bearing face 5b to be engaged by its mating element 6 with which it is adjusted to optimum or zero radial and axial looseness. Once adjusted, the fine pitch of the threads maintains the relationship of the sleeve elements 6 and 7, but any tendency to lose the adjusted position may be prevented by the use of a setscrew or other locking means. The rotating sleeve assembly may be spun or rotated at elevated speeds under combined radial and axial loading for long intervals limited only by the heat rise characteristics of the materials and masses which are used in its construction, without developing any of the objectionable heat and vibration characteristics which are usually associated with prior bearings operated under these conditions. As the speed of rotation may be increased, the oil is forced with increasing pressure and flow against the wick causing the latter to supply quantities of the oil to the bearing faces in direct proportion to the increase in speed.

While the disclosed bearing construction has general application, it has been found particularly adapted to and successfully used in radar systems of the conical scanning type, which require a particularly vibration-free, smooth-running, constant-friction bearing for the support of the paraboloid scanning disk as it rotates. In such systems, both radial and axial loading is imposed and the use of the present bearing in these installations has resulted in a material increase in freedom from microphonics in the radar system, permitting a more uniform match between ultra high frequency speed and scanning disk. The zero clearance characteristics of the disclosed design and its ability to withstand thrust as well as radial and torsional loads has resulted in a material reduction of the target tracking errors created by disk wobble which have heretofore been very objectionable in prior bearings. A further particular advantage of the present bearing construction resides in its provision of a uniform loading of the prime mover, or motor, tending to prevent erratic fluctuations in rotational speed, thereby further aiding in the production and reception of accurate and undistorted signals. The self-lubricating and inherent lubricant retaining properties of the disclosed bearing developed in actual use have permitted its operation under adverse conditions for periods many times in excess of its normal required service life. While the preferred modification illustrates fixed inner and rotatable outer members the invention is also applicable to rotatable inner and fixed outer members wherein the reservoir is cut into the fixed outer member. It is also contemplated that the frusto-conic or part conic surfaces may converge inwardly.

It will be understood that the present bearing construction is adapted for other than the uses which have been described above and is also applicable to idler or loose pulleys, sheaves and idler gears mounted upon fixed shafts, as well as levers or like members which are pivotally mounted upon fixed pivots or pins.

Other forms and modifications of the present construction, both with respect to its general arrangement and the details of its respective parts which may occur to those skilled in the art after reading the above description, are all intended to come within the scope and spirit of the present invention as more particularly set forth in the appended claims.

I claim:

1. In a bearing construction, a fixed shaft element having an enlarged diameter portion, bearing faces carried by said enlarged diameter portion, an outer rotating assembly comprising axially parting mating elements, bearing faces on each of said mating elements for engagement with the bearing faces on said fixed element arranged in such manner that both radial and axial loads are transmitted through said bearing faces from said rotating assembly to said fixed element and a lubricant reservoir formed by a segmentally recessed portion of said enlarged diameter portion of said fixed shaft element for the lubrication of said bearing faces.

2. In a bearing construction, an inner member having an enlarged diameter portion, outwardly converging conic bearing faces on said enlarged portion of said inner member, an outer sleeve assembly comprising a pair of threadedly engaging sleeve elements, each of said sleeve elements having a conic bearing surface arranged to engage one of said conic bearing faces on said enlarged portion, the threaded relationship of said elements arranged to determine the axial and radial clearance between said inner member and said outer sleeve assembly and a lubricant reservoir formed by a segmental recess within the enlarged diameter portion of said inner member for the lubrication of said bearing faces.

3. In a bearing construction subjected to axial and radial loading, a relatively fixed central element having outwardly converging conic bearing faces, an outer rotatable element having a conic bearing face arranged for rotation in contact with one of said fixed element bearing faces, an intermediate rotatable element having a conic bearing face arranged to rotate in contact with the second of said fixed element faces, a lubricant reservoir formed by a segmentally removed portion of said central element for the lubrication of said bearing faces and means for adjusting said outer and intermediate rotatable elements in the axial direction of said central element for establishing the radial and axial rotational clearances therebetween.

4. In a bearing construction, a relatively fixed central element having an enlarged diameter cylindrical portion, conic bearing faces formed at the edges of said cylindrical portion, a two-part rotating assembly having like conic bearing faces arranged for rotational engagement with the bearing faces of said central element, said rotating assembly including a pair of axially parting mating elements, and a lubricant reservoir formed by a segmentally removed portion of said central element cylindrical portion for the lubrication of said bearing faces.

5. In a bearing, the combination of an inner element having conic bearing faces, an outer assembly comprising a pair of threadedly engaging elements each having a conic bearing face arranged for rotational engagement with the bearing faces of said inner element, means including axially extending threads carried by each of said elements of said rotatable assembly for adjusting its clearance axially and radially with respect to said inner element, a lubricant reservoir formed by a recess in said inner element disposed between said inner element and said outer assembly for the lubrication of said bearing faces and wick means disposed within said lubricant reservoir and having portions in contact with the said bearing faces of said outer assembly for the lubrication thereof.

6. A bearing construction for a pair of relatively rotatable members, a first of said members including an enlarged diameter portion having beveled bearing faces, the second said member including a recess portion having like beveled bearing faces, all of said bearing faces being concentrically disposed about a central axis of rotation, a lubricant reservoir formed by a segmentally removed portion of the enlarged diameter portion of the first of said members, and means including axially extending threads concentrically disposed about said central axis of rotation for adjusting one of said members with respect to the other for establishing predetermined clearances between said like bearing faces.

7. A bearing construction for a pair of relatively rotatable members, a first of said members including an enlarged diameter portion having beveled bearing faces, the second said member including a pair of axially parting mating elements each having a recess portion having like beveled bearing faces, all of said bearing faces being concentrically disposed about a central axis of rotation, means dependent upon the axial relationship of said mating elements for adjusting one of said members with respect to the other for establishing predetermined clearances between said like bearing faces, a lubricant reservoir disposed between said members for the lubrication of said bearing faces and wick means disposed within said lubricant reservoir in contact with said beveled bearing faces for the lubrication thereof.

8. A bearing construction for a pair of relatively rotatable members, a first of said members including an enlarged diameter portion having beveled bearing faces, the second said member including axially parting mating elements each having a recess portion having like beveled bearing faces, all of said bearing faces being concentrically disposed about a central axis of rotation, means determining the axial relationship of said mating elements for adjusting one of said members with respect to the other for establishing predetermined clearances between said like bearing faces, a lubricant reservoir disposed between said members for the lubrication of said bearing faces, and a wick carried by one of said members arranged such that it is exposed to said lubricant reservoir and contacts said bearing faces for the lubrication thereof by capillary action.

9. A bearing construction comprising a first member having an enlarged diameter portion including beveled bearing faces, a second member comprising axially parting mating elements, each said mating element of said second member having a beveled bearing face for engagement with the beveled bearing faces of said first member, each of said bearing faces concentrically disposed about a central axis of rotation, one of said members arranged to rotate with respect to the other said member in a normal direction of rotation, means for fixing the axial relationship of said mating elements for establishing predetermined minimum clearances between said bearing faces, a lubricant reservoir disposed between said members for the lubrication of said bearing faces, and a wick disposed at the trailing side of said reservoir as determined by said normal direction of rotation arranged to serve as a barrier to prevent the contents of said reservoir from rotating freely about said central axis of rotation.

10. A bearing construction comprising a first member having an enlarged diameter portion including tapered bearing faces and an intermediate cylindrical bearing face, a second member comprising axially parting mating elements, each said mating element of said second member having a tapered bearing face for engagement with the tapered bearing faces of said first member, at least one of said mating elements having a cylindrical bore to receive said cylindrical bearing face, each of said bearing faces being concentrically disposed about a central axis of rotation, one of said members arranged to rotate about the other said member in a normal direction of rotation, adjustment means for fixing the axial relationship of said mating elements for establishing predetermined minimum clearances between said bearing faces, a lubricant reservoir disposed between said members for the lubrication of said bearing faces, and wick means disposed in the trailing portion of said reservoir as determined by said normal direction of rotation in lubricating contact with each of said bearing faces arranged in such manner that a substantially uniform friction characteristic is developed at a constant speed of rotation about said central axis.

CHARLES F. DERBYSHIRE.

REFERENCES CITED

The following references are of record in the file of this patent:

UNITED STATES PATENTS

| Number | Name | Date |
|---|---|---|
| 766,244 | Hachmann | Aug. 2, 1904 |
| 906,675 | Barber | Dec. 15, 1908 |
| 1,130,360 | Wilder | Mar. 2, 1915 |
| 1,242,154 | Dickinson | Oct. 9, 1917 |
| 2,127,854 | Bath | Aug. 23, 1938 |

FOREIGN PATENTS

| Number | Country | Date |
|---|---|---|
| 25,210 | Great Britain | Nov. 10, 1896 |
| 553,068 | France | May 12, 1933 |